(12) United States Patent
Webb et al.

(10) Patent No.: US 10,380,714 B2
(45) Date of Patent: Aug. 13, 2019

(54) SYSTEMS AND METHODS FOR AMBIENT ANIMATION AND PROJECTING AMBIENT ANIMATION ON AN INTERFACE

(71) Applicants: Denso International America, Inc., Southfield, MI (US); DENSO CORPORATION, Kariya, Aichi-pref. (JP)

(72) Inventors: Gareth Webb, Farmington, MI (US); Dustin Garrett, Coleman, MI (US); Cary Horvath, Dearborn, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/715,342

(22) Filed: Sep. 26, 2017

(65) Prior Publication Data

US 2019/0096029 A1 Mar. 28, 2019

(51) Int. Cl.
| | | |
|---|---|---|
| *G06T 3/00* | (2006.01) | |
| *G06T 11/00* | (2006.01) | |
| *G06T 13/80* | (2011.01) | |
| *G06T 15/50* | (2011.01) | |

(52) U.S. Cl.
CPC .......... *G06T 3/0037* (2013.01); *G06T 11/001* (2013.01); *G06T 13/80* (2013.01); *G06T 15/506* (2013.01); *G06T 2200/08* (2013.01)

(58) Field of Classification Search
None
See application file for complete search history.

(56) References Cited

U.S. PATENT DOCUMENTS

| 6,169,516 B1 | 1/2001 | Watanabe et al. | |
|---|---|---|---|
| 2009/0228158 A1 | 9/2009 | Medler et al. | |
| 2012/0026289 A1* | 2/2012 | Suenaga | H04N 13/122 348/44 |
| 2012/0147133 A1 | 6/2012 | Hadwiger et al. | |
| 2015/0243084 A1* | 8/2015 | Kanemaru | G06T 19/006 345/426 |

(Continued)

FOREIGN PATENT DOCUMENTS

| DE | 102006018672 A1 | 10/2007 |
|---|---|---|
| DE | 102010053895 A1 | 6/2012 |

(Continued)

OTHER PUBLICATIONS

CSSDA, "20 Excellent Sets of Icons With Color & Personality"20140228, cssdesignawards.*

*Primary Examiner* — YuJang Tswei
(74) *Attorney, Agent, or Firm* — Harness, Dickey & Pierce, P.L.C.

(57) ABSTRACT

An ambient animation system, including an image sensor configured to capture an image of an environment outside of a vehicle, a display interface configured to display information to a driver of the vehicle, and a controller in communication with the image sensor and the display interface and configured to generate a virtual spherical lighting object, shape the image to fit around the virtual spherical lighting object, and project a portion of the image fitted around the virtual spherical lighting object onto the display interface.

18 Claims, 9 Drawing Sheets

(56) References Cited

U.S. PATENT DOCUMENTS

| | | | | |
|---|---|---|---|---|
| 2015/0254861 A1* | 9/2015 | Chornenky | ............ | G01C 15/00 348/135 |
| 2015/0358613 A1* | 12/2015 | Sandrew | ............... | G06T 15/205 348/36 |
| 2018/0093619 A1* | 4/2018 | Han | ................... | G06K 9/00791 |

FOREIGN PATENT DOCUMENTS

| | | | |
|---|---|---|---|
| JP | 2004-157434 | A | 6/2004 |
| JP | 2007-030531 | A | 2/2007 |
| JP | 2007-099014 | A | 4/2007 |
| JP | 2008-168693 | A | 7/2008 |
| JP | 2009-276943 | A | 11/2009 |
| JP | 2010-058633 | A | 3/2010 |
| JP | 2011-121544 | A | 6/2011 |
| JP | 2014-052343 | A | 3/2014 |
| JP | 2014-213636 | A | 11/2014 |
| JP | 2016-194924 | A | 11/2016 |

* cited by examiner

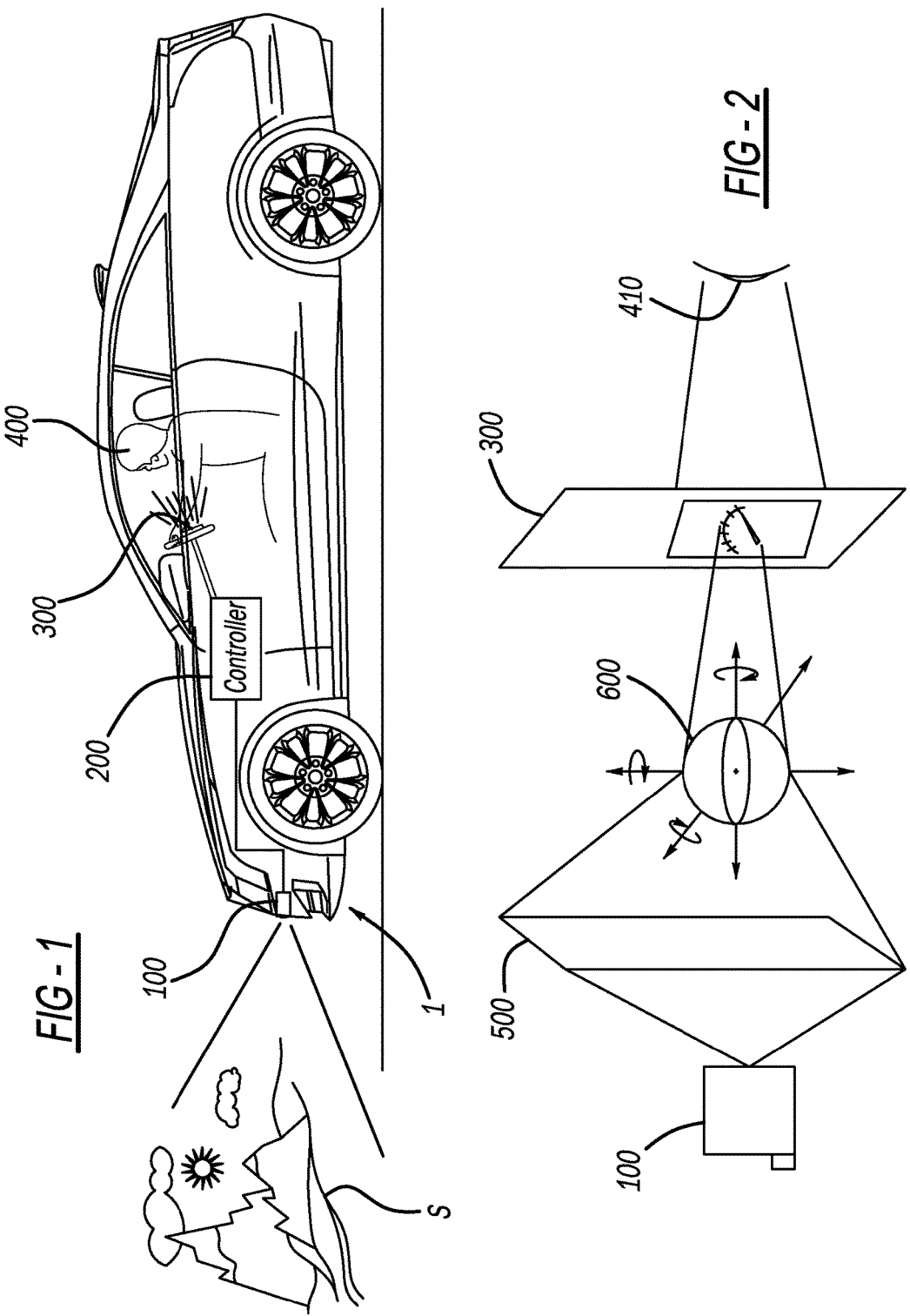

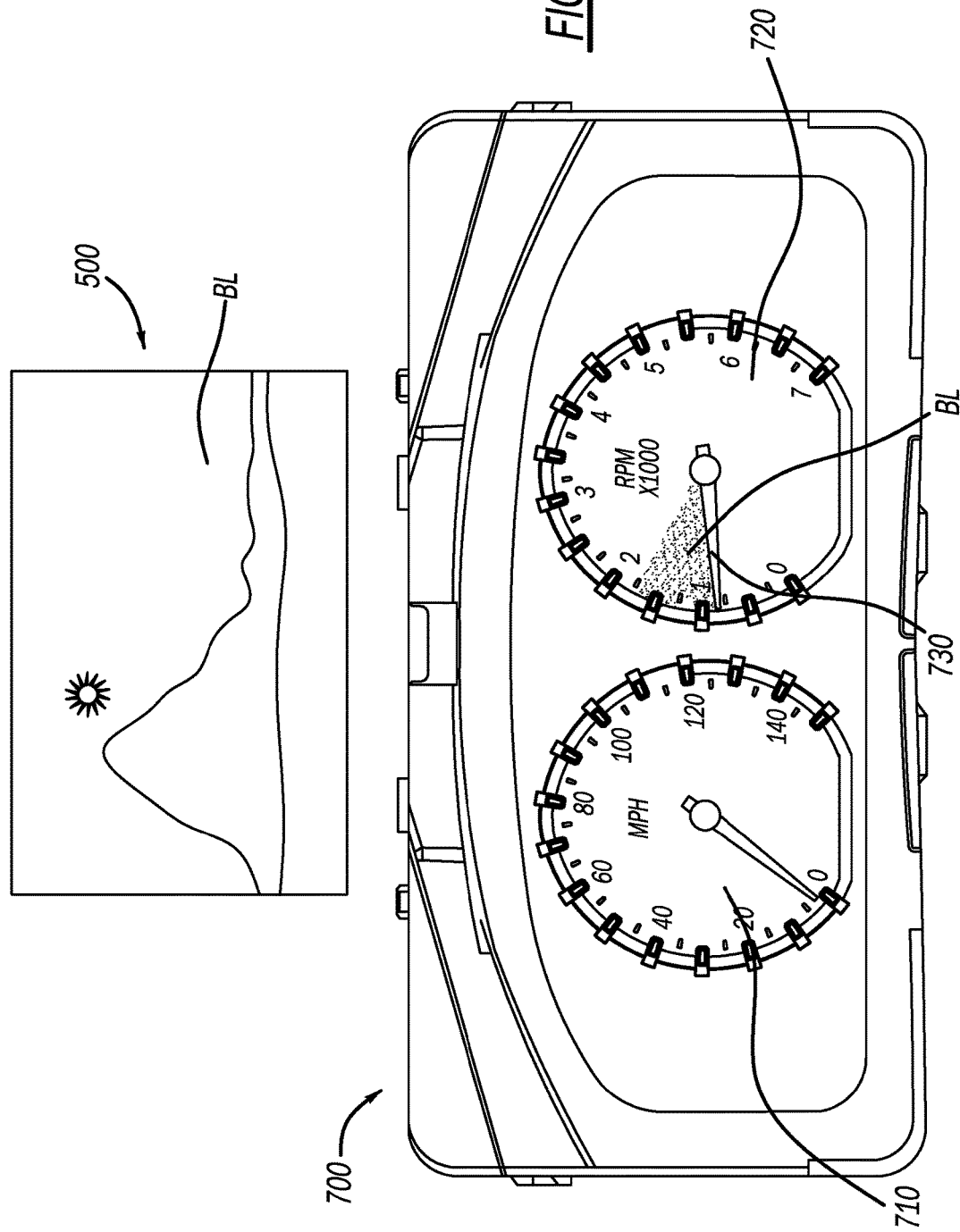

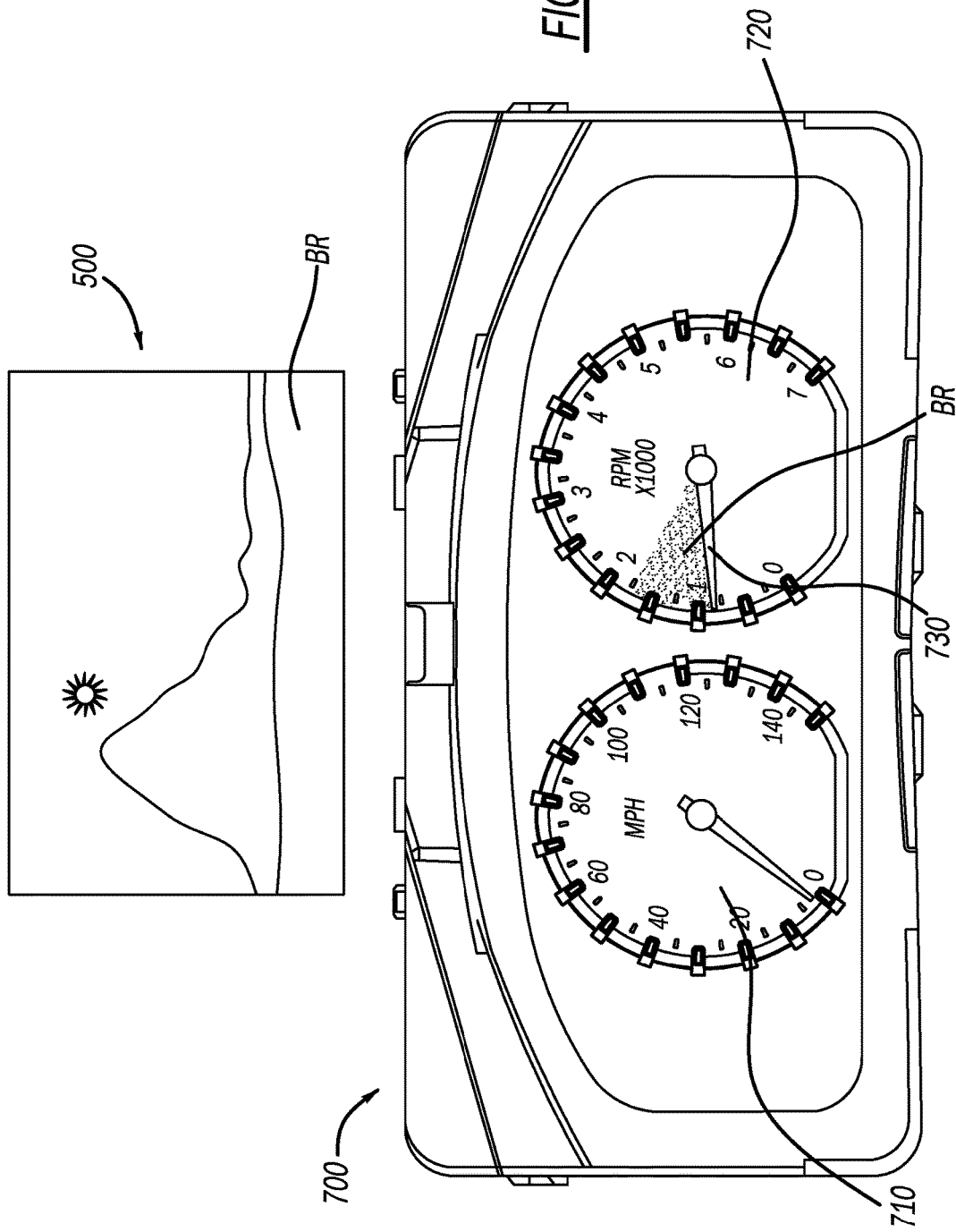

SYSTEMS AND METHODS FOR AMBIENT ANIMATION AND PROJECTING AMBIENT ANIMATION ON AN INTERFACE

FIELD

The present disclosure relates to systems and methods for ambient animation projecting ambient animation on an interface.

BACKGROUND

This section provides background information related to the present disclosure which is not necessarily prior art.

Digital interfaces inside a vehicle are increasingly replacing analog displays in the interior cabin of vehicles and traditional instrument panels and center consoles of vehicles. For example, these digital interfaces can emphasize certain features or controls of the vehicle, such as an audio control for the radio of the vehicle or a display of the power generated by the engine of the vehicle.

However, the effects of these digital interfaces do not take into consideration the state of the current environment outside of the vehicle. Also, the images displayed on the digital interface are flat and two-dimensional, making the driving experience dull and uninteresting for the driver.

There is a need to further enhance the animation on the digital interface and make the driving experience more enjoyable for the driver, especially on long trips spent inside the vehicle.

SUMMARY

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

The present teachings include an ambient animation system. The ambient animation system includes an image sensor configured to capture an image of an environment outside of a vehicle, a display interface configured to display information to a driver of the vehicle, and a controller in communication with the image sensor and the display interface and configured to generate a virtual spherical lighting object, shape the image to fit around the virtual spherical lighting object, and project a portion of the image fitted around the virtual spherical lighting object onto the display interface.

The present teachings also include an ambient animation method. The method includes capturing an image of a scenery outside of a vehicle with an image sensor, generating, with a controller, a virtual spherical lighting object, shaping, with the controller, the image to fit around the spherical lighting object; and projecting, with the controller, a portion of the image that is fitted around the spherical lighting object onto a display interface of a vehicle.

DRAWINGS

The drawings described herein are for illustrative purposes only of selected embodiments and not all possible implementations, and are not intended to limit the scope of the present disclosure.

FIG. 1 illustrates a vehicle including an ambient animation system according to the present teachings;

FIG. 2 is a schematic drawing of an ambient animation system according to the present teachings;

FIG. 6B illustrates another display interface of an ambient animation system according to the present teachings;

FIG. 6C illustrates another display interface of an ambient animation system according to the present teachings;

Corresponding reference numerals indicate corresponding parts throughout the several views of the drawings.

DETAILED DESCRIPTION

Figure 3A:
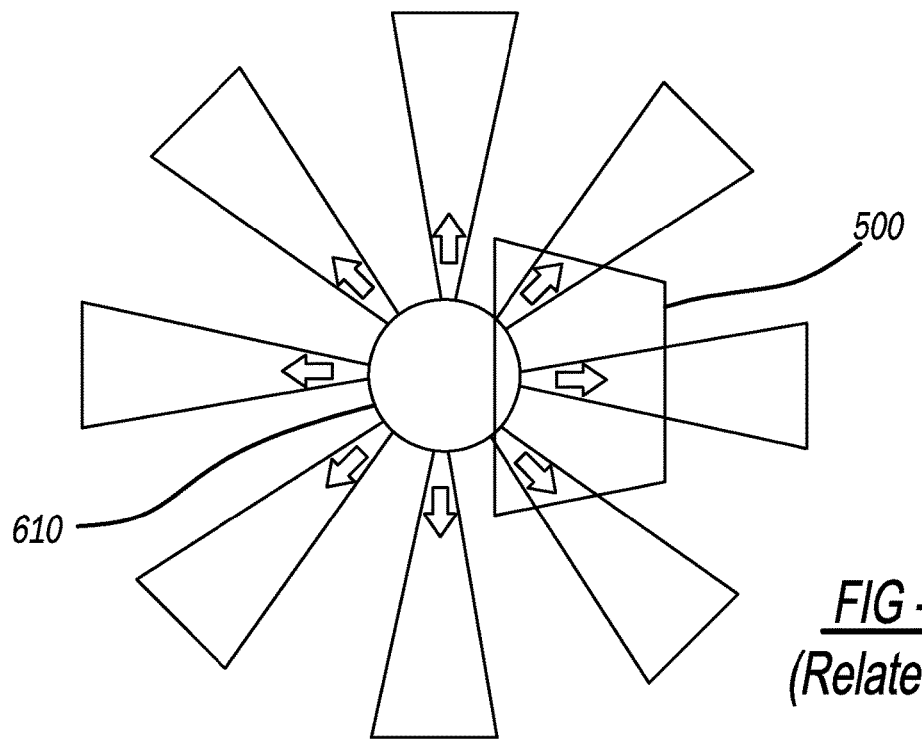
FIG. 3a is a close-up of a lighting object.

Example embodiments will now be described more fully with reference to the accompanying drawings.

FIG. 1 illustrates a vehicle 1 including an ambient animation system according to the present teachings. In FIG. 1, the vehicle 1 includes an imager such as a camera 100 that includes an image sensor, a controller 200, and a display interface 300 connected and in communication with each other. The vehicle 1 can be an automobile, truck, motor craft, or any other machinery powered by an engine or motor. Also, the image sensor within the camera 100 may include sensors that detect intensity, color tone, or other characteristics of light.

The ambient animation system allows for communication between the camera 100, which may be mounted outside of the vehicle 1, and the controller 200, which may be within the vehicle 1. That is, the camera 100 takes an image of scenery S, which includes images of the outdoor ambient environment, and a digital image signal is sent to the controller 200 for processing. The controller 200 then determines and projects one or more colors and intensity of light matching the ambient outdoor condition as part of ambient lighting onto the display interface 300. The display interface 300 may be located on or inside the vehicle 1. (e.g., meter cluster/central information display (CID)/digital dashboard/rear screen/etc).

In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

The vehicle 1 can also include a global positioning system (GPS) (not shown) that detects or determines a current location of the vehicle 1. The vehicle can also include other image sensors in place of the camera 100, and environmental sensors (not shown) such as Lidar sensors, radar sensors, ultrasonic sensors, or other sensors mounted on the front of the vehicle 1. The image sensors and the environmental sensors detect information about the surroundings of the vehicle 1. Data from the image sensors and the environmental sensors can be communicated to and received by the controller 200. For example, data from the image sensor and the environmental sensor can be communicated to the controller 200 through a communication device 230, shown in FIG. 4 and discussed in detail below.

The display interface 300 may include a variety of informational displays in the vehicle 1. For example, the display interface 300 can be a multi-functional display in a meter cluster, a navigation device, or some other device located in the interior of or on the vehicle 1. In this way, the display interface 300 displays information to the driver 400 and, more specifically to the eyes 410 (shown in FIG. 2) of the driver 400 for the driver 400 to see.

As will be described below, the ambient animation system senses the colors and lighting of the three dimensional scenery S outside of the vehicle 1 and displays one or more of those colors on the display interface 300 as background lighting, for example, in conjunction with the information already being displayed on the display interface 300 located on or within the vehicle 1 for the driver 400 to enhance the driver's enjoyment of the experience of driving or riding in the vehicle 1.

FIG. 2 is a schematic drawing illustrating how the ambient animation system according to the present teachings displays colors detected outside of the vehicle 1 as part of the display interface 300. In FIG. 2 the camera 100 captures light from the scenery S, which may be an environment outside of the vehicle 1, also referred to as an "ambient outside condition," and produces a digital image signal that may be processed by the controller 200 to create a flat image 500. For example, the digital image signal is sent to a controller 200 to create the flat image 500, which is a two-dimensional representation of the scenery S (i.e., the ambient outside condition) as detected by the camera 100. The flat image 500 is then processed and shaped by the controller 200 to conform, bend, fit, and/or wrap around a virtual spherical lighting object 600 created by the controller 200. In this way, the controller creates the spherical lighting object 600 surrounded by the wrapped-around image 500 (i.e., the previously flat image 500). The spherical lighting object 600 is a digital or virtual representation of a spherical object.

The controller uses the construct of the virtual representation of the spherical object with the wrapped around image 500 to project the spherical and wrapped around image 500 onto the display interface 300 of the vehicle 1 for the driver 400 to see. This allows the lighting and the color hue of the image 500 wrapped around the spherical lighting object 600 to correspond with that of the outdoor ambient environment outside of the vehicle 1.

The controller 200 is able to virtually rotate and move the spherical lighting object 600 in virtual three dimensional space (in XYZ coordinates) to display difference colors from the image wrapped around the spherical lighting object onto the display interface 300. When used to display colors on the display interface 300, the movement of the spherical lighting object 600 may be visible to the driver 400 when the light from the spherical lighting object 600 is projected on the display interface 300. For example, if the spherical lighting object 600 is virtually projected on the upper left of the display interface 300, that area would be most saturated with light, and the brightest colors would be in that location and then fade from there.

FIG. 3a is a close-up of a lighting object according a related art. Here, computer-generated general light source 610 projects light in all directions, with only part of the projected light traveling to a flat image 500, and partial light travels through the flat image 500 to project the colors of the flat image 500 to the display interface (not shown). Here, since not all of the light from the light source 610 is used to project light onto the image 500, the light projection does not appear as vivid or three dimensional to the driver (not shown). Instead the image 500 appears flat and uninteresting.

Also, because the image 500 is flat, it may be difficult for the light from the light source 610 to project different colors of the image 500 onto the display interface.

Figure 3B:
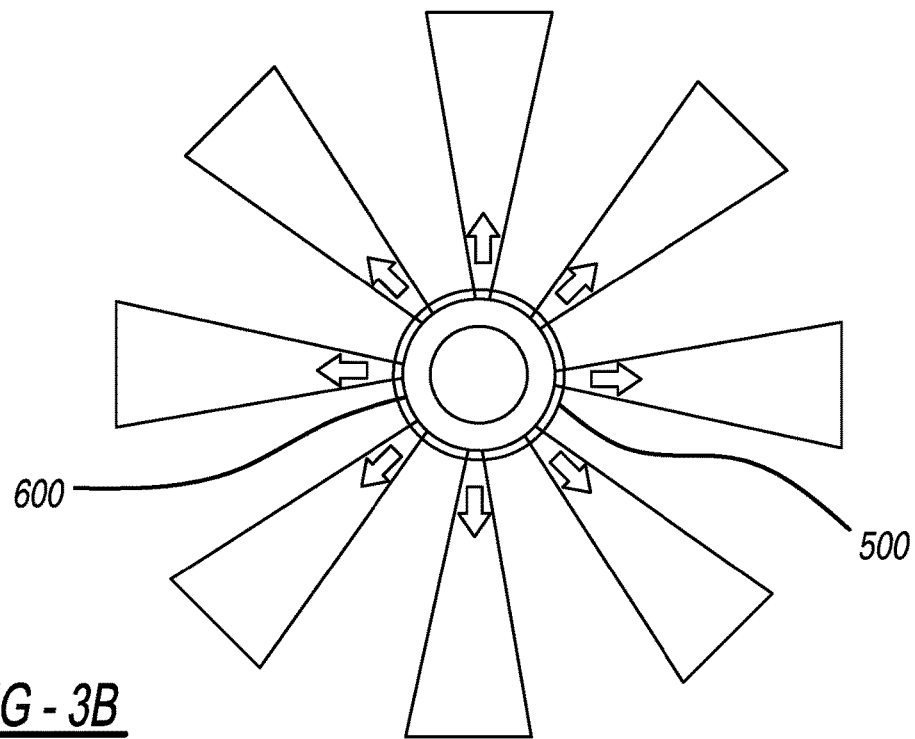
FIG. 3b is a close-up of a spherical lighting object of an ambient animation system according to the present teachings.

FIG. 3b is a close-up of the spherical lighting object 600 of the ambient animation system according to the present teachings. Here, the flat image 500 from the camera 100 is wrapped around the spherical lighting object 600. As such, all of the light coming from the spherical lighting object 600 and projecting in different directions is able to illuminate the entire wrapped-around image 500. Also, as the wrapped around image 500 rotates with the spherical lighting object 600, different colors from the image 500 corresponding with outside ambient lighting is able to be projected in different direction.

As an example, one way to visualize the spherical lighting object 600 is to imagine a person in a room, where the walls, floor, and ceiling are covered with a metallic material and a light bulb that is similar to the spherical lighting object 600 exists inside the room. This light bulb, with a spherical surface, has a blue and red color image surrounding the surface of the light bulb. When the light bulb is turned on, blue and red colored lights are emitted throughout the room and are projected onto the metallic walls. As one rotate the light bulb with the blue and red color image on the surface of the light bulb, the color projected on a particular area of the wall also changes. The spherical lighting object 600 corresponding with the exemplary light bulb works in a similar way with the wrapped around image 500.

In more detail, the camera 100 in the vehicle 1 generates the image 500. The image 500 is then processed by the controller 200 into a high dynamic range image (HDRI), in which the spherical lighting object 600 has a flat image 500 next to the spherical lighting object 600. The flat image 500 is then wrapped around that spherical lighting object 600 fully, with light protruding from the spherical lighting object 600.

Similar to the example above, the light protrudes from the spherical lighting object 600, goes through the wrapped around, essentially spherical image 500, and projects colored light corresponding to the colors of the image wrapped around the spherical lighting object 600 in all directions into the surrounding environment. Depending on the rotation of the spherical image 500 with the spherical lighting object 600, different colored graphics corresponding with the ambient lighting of the outside environment is projected onto the display interface 300.

By wrapping the image 500 into a spherical shape around the spherical lighting object 600, all of the light from the spherical lighting object 600 is used to project the colors from the wrapped around image 500, as opposed to having a flat image 500 in front of the lighting object, which would only push the colored light in a singular, one dimensional direction in which the flat image 500 faces. Therefore, a brighter illuminated color may be projected onto a display interface. Also, as the sphere moves or rotates, it may be easier to project different colored lights from different parts of the wrapped around image 500 onto a particular interface, compared with the case where a flat image 500 is involved.

As discussed previously, the spherical lighting object 600 with the wrapped around image 500 may be moved, rotated, tilted, turn it on its axis, etc. Here, the wrapped around image 500 may move and rotate with the spherical lighting object 600. As such, the spherical lighting object 600, along with the wrapped around image 500 will cast different colored light in different directions toward the display interface 300, as the orientation of the spherical lighting object 600 with the wrapped around image 500 is changed. In other words, a color projected from the spherical lighting object 600 and through the wrapped around image 500 changes according to the rotation of the spherical lighting object 600 with the wrapped around image 500.

Figure 4:
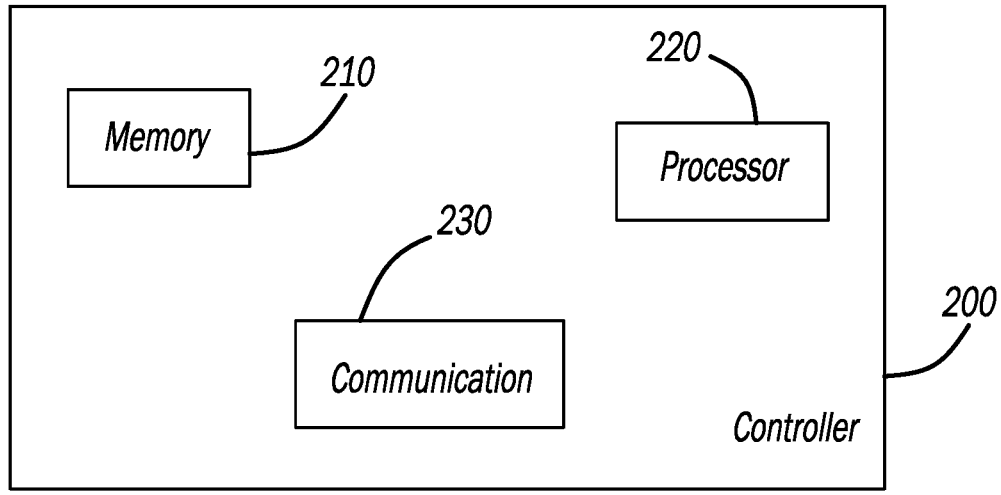
FIG. 4 is a block diagram of a controller of an ambient animation system according to the present teachings.

FIG. 4 is a block diagram of the controller of the ambient animation system according to the present teachings. The controller 200, which may be a microcomputer, includes a memory 210 connected to a processor 220 and connected to a communication device 230. The memory 210 may store the image data of the image 500 taken by the camera 100, including color information or the light intensity captured by the camera 100. The communication device 230 may communicate information with other devices in the vehicle 1, or to other devices outside of the vehicle 1. The controller 200 may have hardware components programmed with software to implement the software program.

Figure 5:
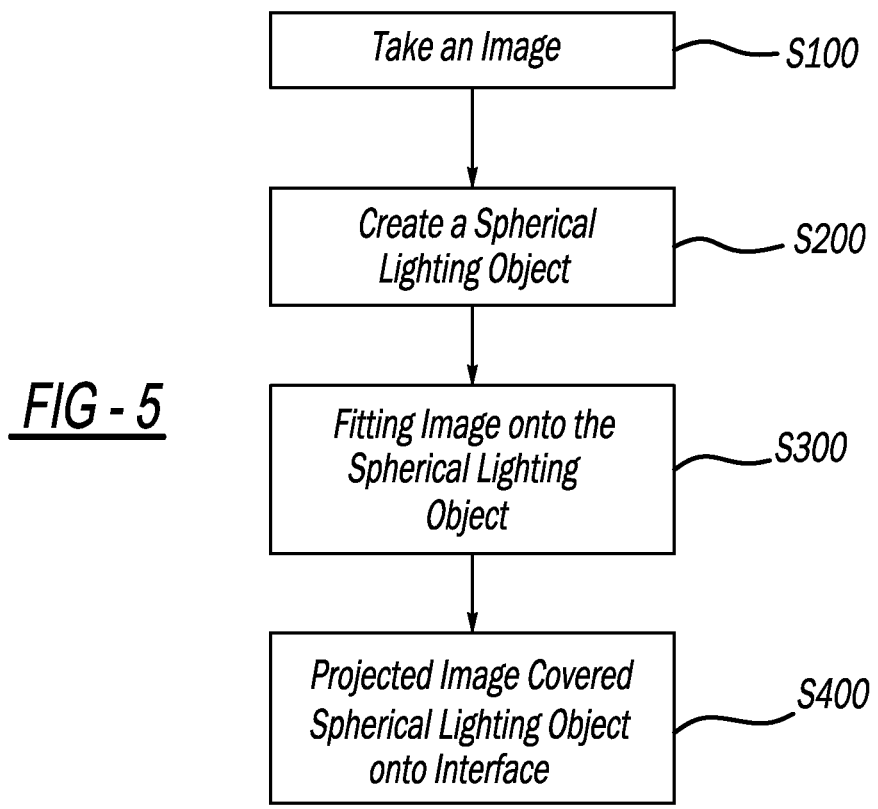
FIG. 5 is a flow-chart of a method performed by a controller of an ambient animation system according to the present teachings.

FIG. 5 is a flow-chart of a method performed and implemented by the controller 200 of the ambient animation system according to the present teachings. In step S100, the camera 100 takes an image 500 of the scenery S. The image data signal of the image 500 is then sent to the controller 200. At step S200, the controller 200 generates a virtual spherical lighting object 600. At step S300, the controller 200 then virtually fits or wraps the image 500 captured by the camera 100 to the virtual spherical lighting object 600. Then, at S400, the controller virtually projects the image 500-covered spherical lighting object 600 onto the display interface 300 for the driver 400 to see with his or her eye 410. In other words, the controller 200 carries out steps S200-S400 in virtual space.

The ambient animation system may be part of a navigation system or meter cluster that can "absorb" the lighting situation from the outside world and display corresponding colors on a display interface of the vehicle. Example implementations of the ambient animation system according to the present teachings are provided below.

Figure 6A:
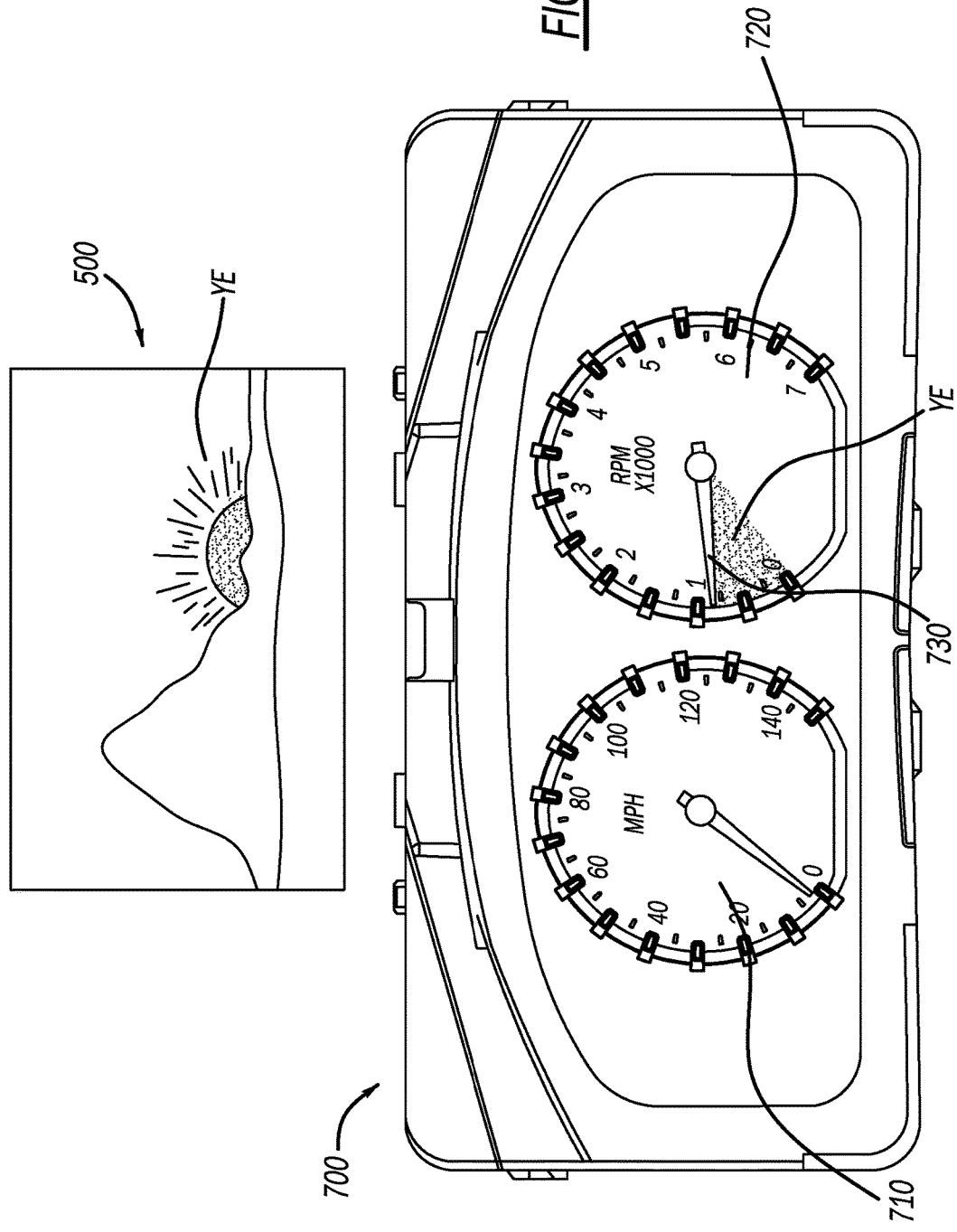
FIG. 6A illustrates a display interface of an ambient animation system according to the present teachings.

FIG. 6A illustrates the display interface 300 of the ambient animation system according to the present teachings. In this example, the display interface 300 is a meter cluster 700, as shown on the bottom half of FIG. 6A. The meter cluster 700 includes a speedometer 710, a tachometer 720, and a needle 730 within the tachometer 720. The top of FIG. 6a also shows an image 500 taken by the camera 100. In this case, the vehicle 1 drives through a desert scene S, such as the Mojave Desert, with a mountain in the background. The controller 200 on the vehicle 1 receives the image 500 of a desert scene S, such as a digital image 500 from the front camera 100 of vehicle 1. The controller 200 will then use the image 500 as a "live light source" (i.e., not simple color) for the graphics and project that light onto the "surfaces rendered" (i.e., any shape that makes up a digital graphic portion of the Human Machine Interface (HMI) interface or meter cluster graphics.

In this example, the camera 100 detects or takes an image 500 of the outside environment at a particular time of day, such as during sunrise or sunset. Here, all of the colors of the sky taken by the camera 100 during this time, the oranges, the yellows, the blacks, the grays, the blues, anything that is in the image 500 is detected, processed by the processor 220 and recorded into the memory 210 of the controller 200. Any of those colors may then be assigned by the controller 200 to be projected from the spherical lighting object 600 to a particular part of the display interface 300 in the form of the meter cluster 700. Alternatively, the color of the image 500 may be assigned as a layer on top of the entire meter cluster 700.

The frame of meter cluster 700 has the "light source" from the spherical lighting object 600 from the desert scene S projected on it (i.e., from the feed of the camera 100). These graphics may be updated every few second(s) or minute(s) automatically or manually, and re-rendered at or near "real time" so that the light source is always rendering a live or recently live image 500 of what the camera 100 captures of the scenery S. In the sun-setting situation, where the sun is setting outside of the vehicle 1, the process allows colors corresponding with the changing colors of the sky to be projected onto the meter cluster 700. Here, the projected colors changes colors corresponding to the changing outside ambient colors of the sky that goes from blue, orange, pink, etc., to successively darker colors, before ending in pitch black color.

In particular, the image 500 shows a scenery S of a sunrise or sunset, which has a yellow YE background, which depicts the sky color near the sun. This color is then captured by the camera 100 in the image 500, which is then wrapped around the spherical lighting object 600 by the controller 200. The spherical lighting object 600 then projects the yellow YE color from the image 500 to a portion of the tachometer 720 below the needle 730. This can be made as an animation to show the change of the revolution per minute (RPM) in the engine of a vehicle 1. (i.e., to show the increasing engine RPM corresponding to an accelerating vehicle and/or increased fuel intake by the engine of the vehicle 1 for the driver 400 to see with his/her eye 410).

It is noted that often the image 500 would be projected only on portions of the display interface 300 assigned by the controller 200, instead of an entire image 500 overlaid over the entire display interface 300. For instance, in the meter cluster 700 above, only the area below the needle 730 is projected colored light from the spherical lighting object 600 and the image 500.

Also, the part of the "live light source" (i.e., part of the image 500 that the controller 200 is focused on or pointed to with reference to the ground the vehicle 1 is traveling) may be changed within the image 500 taken by the driver 400. The controller 200 may select different color tones based on the angles, even if the image 500 from the camera 100 is the same image 500 taken at a specific time, i.e. if such angle is adjusted to focus on the desert area, the color tone of the frame of meter cluster should have brown BR color tone. If such angle is adjusted to focus on the upper part of the sky, the color tone of the frame of meter cluster should be blue BL color tone.

For example, FIG. 6B is a variation of the display interface of the ambient animation system according to the present teachings. Here, if a vehicle 1 is traveling in the middle of the day, the image 500 captured by the camera 100 may have a blue BL color depicting the blue sky. This blue BL color is then captured by the camera and made into an image 500 and then fitted to the spherical lighting object 600 to pass onto the display interface 300 of the meter cluster 700 and onto the revolution meter 720. So then here the blue color would be shown as an animation on the needle of the revolution meter which may depict a decrease of the revolution in the engine.

FIG. 6C is another variation of the display interface of the ambient animation system according to the present teachings. Here, the vehicle's camera is pointed more towards the ground of the desert in the example. Here, the brown BR color of the desert is captured by the camera 100 and projected to the image 500. The image 500 is then fitted to the spherical lighting object 600 and the wrapped around image is then projected to the display interface 300, in this case the revolution meter 720 within the meter cluster 700. The brown BR color takes the place of the prior blue BL or yellow YE color.

Therefore, while the color of the meter cluster 700 may change based on the time of day, it may also change based on the color captured on part of the image 500 taken by the camera 100 and projected onto the meter cluster 700.

Figure 7A:
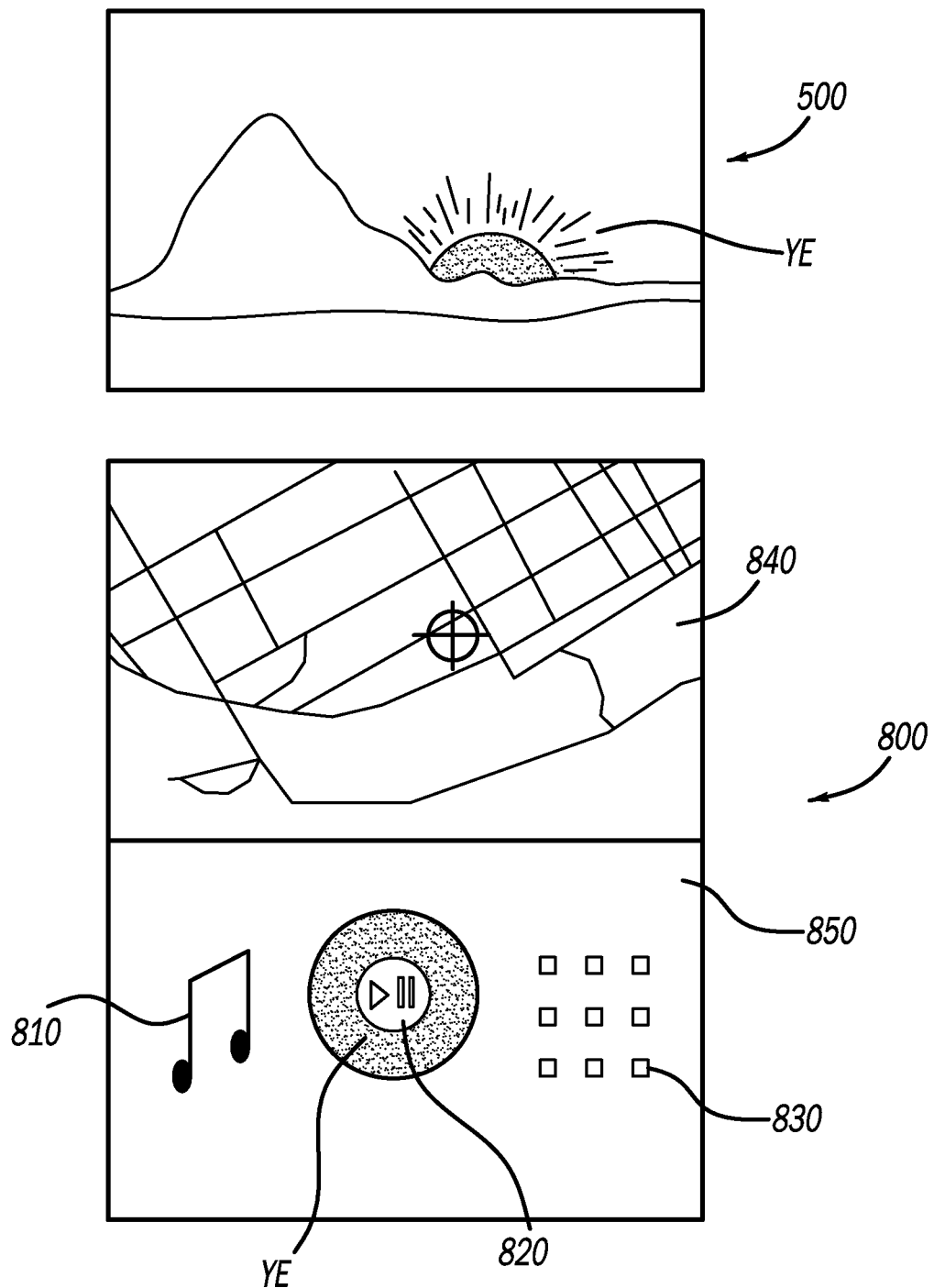
FIG. 7A illustrates another display interface of an ambient animation system according to the present teachings.

FIG. 7A is illustration of the display interface of the ambient animation system according to present teachings. In FIG. 7a, an infotainment display 800 that may be part of a navigation system is shown in place of the meter cluster 700 as being the display interface 300. Here the infotainment display 800 includes an audio icon 810, a GPS navigation icon 820, and an applications icon 830 included in an applications display 850. The infotainment display 800 may be split into separate displays, with the navigation map 840 displayed above the applications display 850. In the current situation, the image 500 captured shows a yellow YE sky background based on the setting or rising sky. That is, the yellow YE light from the sky is projected through the spherical lighting object 600 to surround the GPS navigation icon 820 when the software application associated with the application icon 830 is selected with the accompanying function to display the navigation map 840.

As discussed before, the environment or the color projected to the display interface 300 is based on the color of the image 500 captured by the camera 100 and selected by the controller 200. Additionally, the items displayed on the display interface 300, such as the icons 810-830 may be described as computer-aided design (CAD) features. That is, features that are created through CAD. Each of the icons 810, 820, 830 may separately have a set of CAD that may be assigned a certain set of material lighting functions to that CAD. For example, the navigation icon 820 may be assigned a metal finish, that is, with a reflective metal finish. Then, the spherical lighting object 600 with the spherical image 500 projects light "behind" the navigation icon 820 shown within the applications display 850 on the display interface 300. The yellow YE color then casts onto that reflective metallic finish surrounding the navigation icon.

Here, depending on the color of the image 500 projected onto the interface, what is seen by the driver 400 will change. For example, if the spherical lighting object 600 with the wrapped-around image 500 is rotated, the colors will change based on where in space the display interface 300 is, and where in space the spherical lighting object 600 with the wrapped-around image 500 is. For example, if the spherical lighting object 600 with the wrapped-around image 500 is rotated 90 degrees to the left, different colors come off of it because the image 500 has now been turned into a spherical shape and rotates with the spherical lighting object 600, and different part of the image 500, along with the color of the image 500 is now projected onto the interface 300.

In an alternative, an image 500 may be created, rendered into a spherical shape around the spherical lighting object 600 and lit by the spherical lighting object 600 so that the colors on the wrapped around image 500 may be projected onto the display interface 300. Then, a digital image display interface 300 created with CAD data, or a "CAD box" may be created. The CAD data/CAD box may include data that form a digital meter cluster image, icons displayed within a digital audio-video control interface or digital GPS navigation control interface, etc. This CAD box to be displayed on the display interface 300 may be virtually moved anywhere in the space around that spherical lighting object 600 Conversely, the spherical lighting object 600 may be virtually placed above or below the digital image display interface 300, and the color of the display interface 300 will change depending on what part of the wrapped-around image 500 is moved around and projected on to the CAD box displayed within the display interface 300.

Figure 7B:
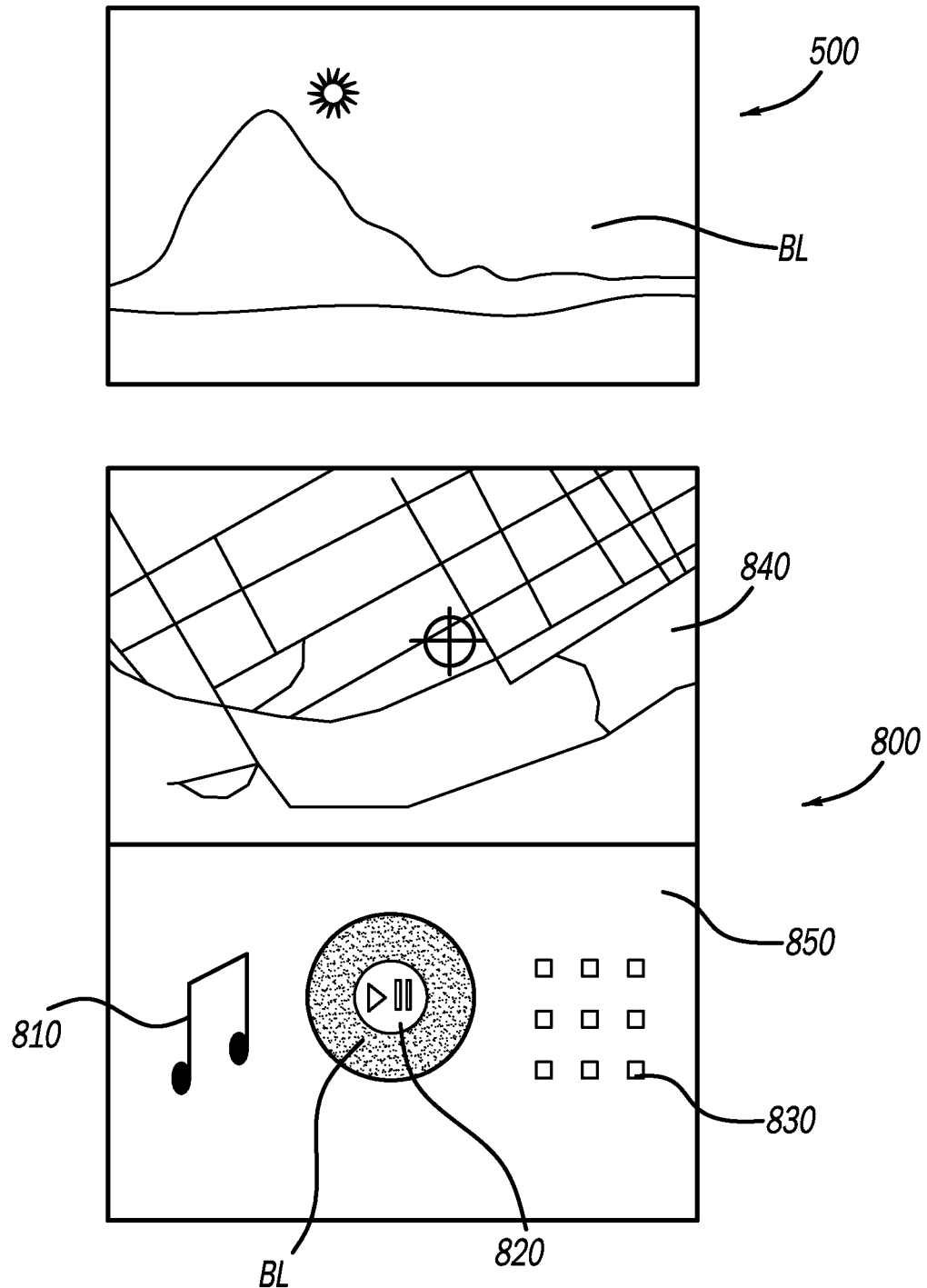
FIG. 7B illustrates another display interface of the ambient animation system according to the present teachings.

FIG. 7B illustrates a variation of the interface of the ambient animation system according to the present teachings. FIG. 7b shows a similar feature as a FIG. 7a, except now the image is taken in the middle of the day. The blue BL sky is now displayed and therefore the color surrounding the selected application function is lighted to be blue BL.

In another example, a "normal condition" for a "rendered surface" in a meter cluster 700 or HMI may be set up, where the "default lighting condition" with a default color from the wrapped around image 500 projected onto the meter cluster 700 by the spherical lighting object 600.

Further, the most rendered color surface in meter clusters 700 may have a light source of a basic white background be virtually projected to it, causing the meter clusters 700 to have highlights when viewed.

Figure 8:
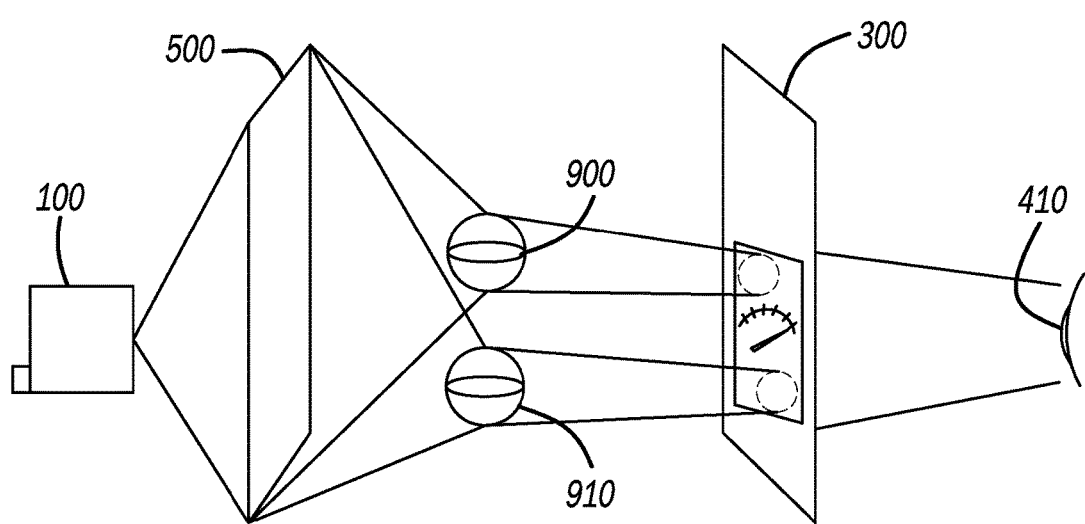
FIG. 8 is a schematic of an ambient animation system according to the present teachings.

FIG. 8 is another schematic drawing of an ambient animation system according to the present teachings. In FIG. 8 the set-up is similar to that depicted in FIG. 2 except there are multiple spherical lighting objects 900, 910. Each of the spherical lighting objects 900, 910 may have an image 500 virtually wrapped around it. Depending on the location and orientation of the spherical lighting objects 900, 910 with their respective wrapped-around images 500, different colors may be virtually projected onto the display interface at different locations at any given time.

For illustrative purposes only two are displayed but there may be more than just the two spherical lighting objects 900 and 910.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An ambient animation system, comprising:
an image sensor configured to capture an image of an environment outside of a vehicle;
a display interface configured to display information to a driver of the vehicle; and
a controller in communication with the image sensor and the display interface and configured to
generate a virtual spherical lighting object,
shape the image to fit around the virtual spherical lighting object, and
project at least one color from the image fitted around the virtual spherical lighting object onto the display interface as background lighting for the display interface without projecting the image of the environment onto the display interface;
wherein the display interface includes a meter cluster configured to absorb a lighting situation from the environment outside of the vehicle by projecting, with the controller, the at least one color from the image fitted around the virtual spherical lighting object with an intensity of light matching the at least one color in the image of the environment outside of the vehicle.

2. The ambient animation system of claim 1, wherein the image sensor is a camera.

3. The ambient animation system of claim 1, wherein the display interface includes a navigation device display.

4. The ambient animation system of claim 1, wherein controller is configured to move and rotate the virtual spherical lighting object in a virtual three-dimensional space.

5. The ambient animation system of claim 4, wherein a color projected from the virtual spherical lighting object and through the image changes according to the rotation of the virtual spherical lighting object with the image.

6. The ambient animation system of claim 4, wherein the movement of the virtual spherical lighting object is configured to be visible on the display interface.

7. The ambient animation system of claim 4, wherein the fitted image is configured to movable and rotatable with the virtual spherical lighting object.

8. The ambient animation system of claim 1, wherein the display interface includes a feature created with computer-aided design (CAD) data, and the virtual spherical lighting object projects light through the fitted image and onto the feature.

9. The ambient animation system of claim 8, wherein the feature includes functional icons.

10. An ambient animation method, comprising:
capturing an image of a scenery outside of a vehicle with an image sensor;
generating, with a controller, a virtual spherical lighting object;
shaping, with the controller, the image to fit around the virtual spherical lighting object; and
projecting, with the controller, at least one color from the image that is fitted around the virtual spherical lighting object onto a display interface as background lighting for the display interface without projecting the image of the scenery onto the display interface;
wherein the display interface includes a meter cluster configured to absorb a lighting situation from the scenery outside of the vehicle by projecting, with the controller, the at least one color from the image fitted around the virtual spherical lighting object with an intensity of light matching the at least one color in the image of the scenery outside of the vehicle.

11. The ambient animation method of claim 10, wherein the image sensor is a camera.

12. The ambient animation method of claim 10, wherein the display interface includes a navigation device display.

13. The ambient animation method of claim 10, further comprising moving and rotating, the virtual spherical lighting object, with the controller, in a virtual three-dimensional space.

14. The ambient animation method of claim 13, wherein a color projected from the virtual spherical lighting object and through the image changes according to the rotation of the virtual spherical lighting object with the image.

15. The ambient animation method of claim 13, wherein the movement of the virtual spherical lighting object is configured to be visible on the display interface.

16. The ambient animation method of claim 13, wherein the fitted image is configured to be movable and rotatable with the virtual spherical lighting object.

17. The ambient animation method of claim 10, wherein the display interface includes a feature created with computer-aided design (CAD) data, and the virtual spherical lighting object projects light through the fitted image and onto the feature.

18. The ambient animation method of claim 17, wherein the feature includes functional icons.

\* \* \* \* \*